March 10, 1959
B. B. JACOBSEN ET AL
2,877,409
MEASUREMENT OF GROUP DELAY IN ELECTRIC COMMUNICATION SYSTEMS
Filed Feb. 16, 1955
2 Sheets-Sheet 1
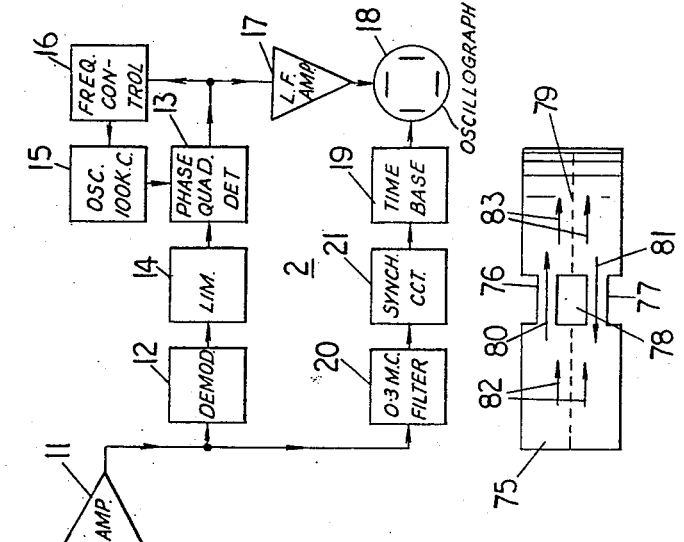
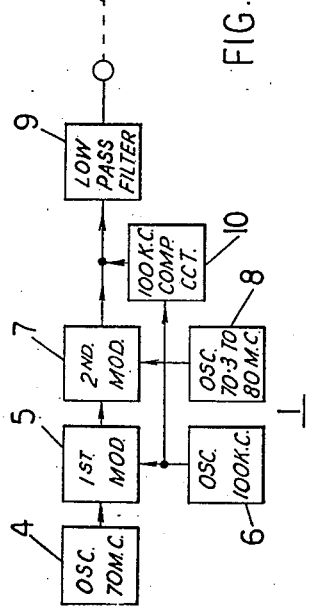
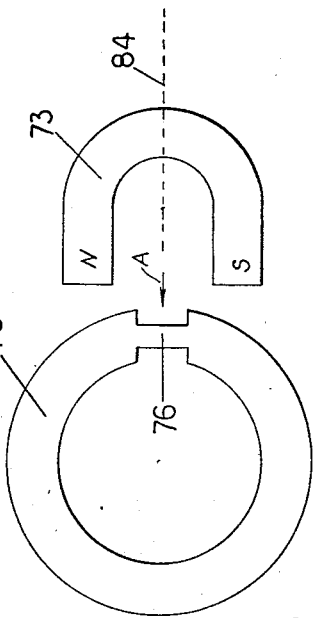
Inventors
B. B. JACOBSEN
I. V. FELDHUSEN
By [signature]
Attorney

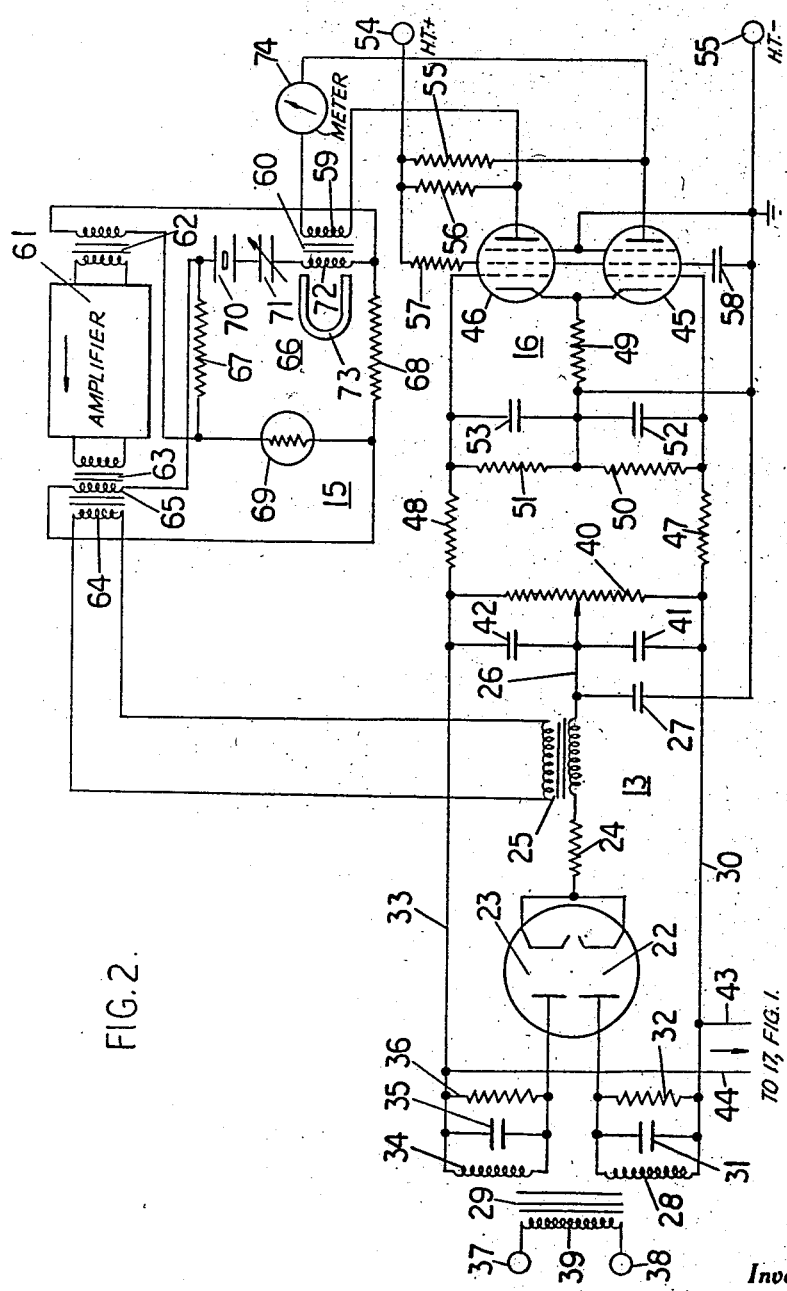

United States Patent Office 2,877,409
Patented Mar. 10, 1959

2,877,409

MEASUREMENT OF GROUP DELAY IN ELECTRIC COMMUNICATION SYSTEMS

Bent Bulow Jacobsen and Igor Vladimir Feldhusen, London, England, assignors to International Standard Electric Corporation, New York, N. Y.

Application February 16, 1955, Serial No. 488,684

Claims priority, application Great Britain March 31, 1954

8 Claims. (Cl. 324—57)

The present invention relates to arrangements for measuring group delay distortion in wide band electric communication systems.

The group delay in a transmission system is measured by the rate of change of the phase shift with frequency, which is conveniently referred to as the "differential phase shift." The invention concerns arrangements of the kind in which the differential phase shift of waves covering a wide band of frequencies, after transmission over a communication system, is measured at the receiving end, and a curve relating the differential phase shift to the frequency is displayed on a cathode ray oscillograph. In one well known arrangement of this kind, the differential phase shift at a given frequency is measured by modulating a carrier wave having the given frequency with a test wave having a much lower frequency, and then demodulating the carrier wave at the receiving end to recover the test wave. The phase difference between the recovered and original test waves is then a measure of the differential phase shift at the frequency of the carrier wave.

In such arrangements it is necessary to provide at the receiving end some standard of phase with which the phase of the recovered test wave can be compared. Hitherto, this has usually been done by transmitting to the receiving end over an auxiliary circuit a wave of some convenient frequency to serve as a phase standard. However, it often happens that no such auxiliary circuit is available, and it is therefore necessary by some means to create a phase standard at the receiving end. There would be no difficulty about this if, for example, an oscillator could be designed whose frequency was absolutely constant. This, however, is impracticable, and it is the principal object of the present invention to provide means whereby the standard of phase can in effect be derived from the waves which are transmitted over the system which is to be tested. In the arrangements which will be described to illustrate the invention, the methods adopted for measuring and displaying the phase shift over the band of frequencies concerned are conventional, and it will be understood that the invention is concerned with the arrangements for producing or stabilising the standard of phase at the receiving end.

The above-mentioned object is achieved according to the invention by providing an arrangement for measuring the group delay distortion introduced by a high frequency communication system over a specified band of frequencies, comprising, at the sending end, means for transmitting over the system a high frequency carrier wave modulated by a test wave having a given frequency outside the specified band, and means for periodically sweeping the frequency of the said high frequency wave over the said band; and at the receiving end, means for recovering the test wave from the carrier wave, a source of a comparison wave having the given frequency, means for indicating the instantaneous phase difference between the recovered test wave and the comparison wave, and means responsive to the average phase of the recovered test wave integrated over a period of several sweep cycles for stabilising the phase of the comparison wave.

The invention will be described with reference to the accompanying drawings in which:

Fig. 1 shows a block schematic circuit diagram of a group delay distortion measuring arrangement according to the invention;

Fig. 2 shows a schematic circuit diagram of certain elements of the receiving circuit of Fig. 1;

Fig. 3 shows a plan view of the core of a saturable inductor shown in the circuit of Fig. 2; and Fig. 4 shows a side elevation of the core shown in Fig. 3.

Referring first of all to Fig. 1, the measuring circuit according to the invention comprises a transmitter 1 and a receiver 2. The circuit or system which is to be tested is connected between the transmitter and the receiver, and is indicated by the dotted line 3. The transmitter 1 is designed to supply to the circuit 3 a carrier wave which is modulated by a test wave having a frequency of 100 kilocycles per second. The frequency of the carrier wave is varied comparatively slowly over the range 0.3 to 10 megacycles per second in such a manner that 50 complete cycles of variation of the carrier frequency are produced per second.

This modulated carrier wave is produced at the transmitter in the following manner. An oscillator 4 supplying a fixed frequency of 70 megacycles per second is connected to a first amplitude modulator 5 supplied with the test wave from an oscillator 6 generating a frequency of 100 kilocycles per second. The modulated 70 megacycle waves from the first modulator 5 are supplied to second amplitude modulator 7, to which is also supplied the output from a variable frequency oscillator 8. The oscillator 8 is arranged to generate a frequency which varies from about 70.3 to about 80 megacycles per second. This variation may be produced for example, by the use of a capacitor forming part of the frequency-determining circuit of the oscillator, and having a rotating vane or vanes driven by an electric motor at such a speed that the frequency range of the oscillator is swept backwards and forwards 50 times per second. Such arrangements are well known and do not need to be described in detail. The output of the second modulator 7 is connected to a low pass filter 9 having a cut-off frequency of about 33 megacycles per second. This filter selects the lower side band from the modulator 7, and this side band consists of a carrier wave having a frequency which varies from 0.3 to 10 megacycles per second, and is modulated by the test wave of frequency of 100 kilocycles per second from the oscillator 6. The modulator 5 should preferably be of the balanced type in order that as little as possible of the 100 kilocycle indicating wave may be supplied directly to the filter 9. As, however, the second modulator 7 generally derives some of the 100 kilocycle test wave from the output sidebands of the first modulator 5, it is necessary to neutralise this by a compensating circuit 10 supplied directly from the oscillator 6, and connected to the output of the modulator 7. It is found that the unwanted 100 kilocycle output from the modulator 7 consists substantially of a sine-wave, and therefore it is possible to adjust the level and phase of the compensating wave from the circuit 10 so that the unwanted output is substantially neutralised.

The modulated carrier waves, after transmission over the circuit 3, are passed through a receiving amplifier 11 at the receiver 2, are demodulated by a balanced demodulator 12 in order to recover the test wave of frequency 100 kilocycles per second. The phase shift of the test wave is measured by a phase quadrature detector 13 which is of a conventional type. Since this detector is not entirely independent of variations in amplitude of the test wave, it is preferable to pass this wave through a limiter 14 before application to the phase quadrature detector 13.

The standard of phase with which the phase of the test wave is compared is produced by an oscillator 15 which supplies waves of frequency 100 kilocycles per second to the phase quadrature detector 13. As has already been explained, the frequency of the oscillator 15 cannot be maintained sufficiently constant, and it is therefore stabilised according to the invention by means of a control circuit 16 connected to the output of the phase quadrature detector 13. The phase quadrature detector 13 produces at its output a voltage which depends in magnitude and sign on the departure of the phase of the indicating wave from phase quadrature with the waves from the oscillator 15. This output voltage is supplied through a low frequency amplifier 17 to the vertically deflecting plates of a cathode ray oscillograph 18. The horizontal deflection of the cathode ray is controlled by a time base circuit 19 in a conventional manner. The circuit 19 is synchronized with the sweeping of the oscillator 8 at the transmitter 1 in the following way: A band pass filter 20 sharply tuned to 0.3 megacycle per second is connected to the output of the amplifier 11, and produces at its output a short pulse each time the frequency of the carrier wave passes through 0.3 megacycle per second. These pulses are applied to a synchronising circuit 21 which in turn controls the triggering of the time base circuit 19 in some suitable way. Since the frequency of the oscillator 8 at the transmitter varies in both directions, use is made only of the sweeps in one direction, and by well known methods the time base circuit 19 is arranged to suppress the cathode ray during the periods of the sweeps which are not used. In this way there is produced on the screen of the oscillograph a trace which relates the instantaneous difference between the phases of the recovered test wave and the wave from the oscillator 15, to the corresponding frequency of the carrier wave. It will be clear from the explanation given above, that the trace also represents the relation between the differential phase shift and the carrier frequency, and the oscillograph can be provided with a scale indicating the corresponding group delay.

It has already been stated that the phase quadrature detector 13 produces at its output a voltage depending on the phase difference between the test wave and the wave from the oscillator 15. Since the frequency of the carrier wave is periodically and regularly swept over a given range, and since in general it can be assumed that the differential phase shift introduced by the circuit 3 at any carrier frequency remains approximately constant, it will be understood that the average phase shift of the test wave obtained from the demodulator 12, and integrated over a period which is long compared with the sweep period, will also be substantially constant. Such an integration is performed in the control circuit 16 by means of a storage circuit of relatively large time constant, and the circuit 16 produces a control current at its output depending in magnitude on the average phase shift of the test wave. This control current is supplied to control the frequency of the oscillator 15 in a manner which will be explained in detail with reference to Fig. 2. Thus it will be seen that while a voltage proportional to the instantaneous phase difference is supplied to the oscillograph 18 through the amplifier 17, a current proportional to the phase difference integrated over a long period is produced in the phase control circuit 16 for stabilising the phase of the oscillator 75, by making slight adjustments to its frequency.

Referring now to Fig. 2, this figure shows in detail the phase quadrature detector 13, the control circuit 16, and the circuit of the oscillator 15. The phase quadrature detector 13 is conventional, and consists of a pair of diodes 22 and 23, which may be included in the same envelope as shown. The cathodes of the diodes 22 and 23 are connected together and through a resistor 24, and through the secondary winding of an input transformer 25 to a neutral conductor 26 which is connected to ground through a capacitor 27. The anode of the diode 22 is connected through the secondary winding 28 of an input transformer 29 to a conductor 30. The winding 28 is tuned to 100 kilocycles per second by a capacitor 31, and is shunted by a resistor 32. The anode of the diode 23 is likewise connected to a conductor 33 through another secondary winding 34 of the transformer 29, the winding 34 being tuned by a capacitor 35 and shunted by a resistor 36. The elements 34, 35 and 36 are similar to the elements 28, 31 and 32 respectively. The recovered 100 kilocycle test wave from the limiter 14 (Fig. 1) is supplied to terminals 37 and 38 connected to the primary winding 39 of the transformer 29. The neutral conductor 26 is connected to the movable contact of a potentiometer 40 connected between conductors 30 and 33. The two portions of the potentiometer 40 are shunted by equal capacitors 41 and 42. Conductors 30 and 33 are respectively connected to the amplifier 17 (Fig. 1) by conductors 43 and 44. The output of the oscillator 15 is supplied to the primary winding of the transformer 25. The phase quadrature detector 13 produces a difference of potential between the conductors 30 and 33 which is proportional to the cosine of the phase difference between the 100 kilocycle waves respectively supplied to the transformers 25 and 29, so that this difference of potential is zero when these waves are in phase quadrature. The potentiometer 40 is provided to enable the voltage difference to be adjusted to zero under conditions of phase quadrature.

The difference of potential between the conductors 30 and 33 is supplied to the control circuit 16 which includes a pair of similar valves 45 and 46. The control grids of these valves are connected respectively to conductors 30 and 33 through equal large resistors 47 and 48, having resistances of 1 megohm, for example. The cathodes of these valves are connected together and to ground through a resistor 49. The control grids are also connected to ground through equal resistors 50 and 51 which are shunted by equal large capacitors 52 and 53, which may, for example, have capacity of about 1 microfarad. The anodes of the valves 45 and 46 are respectively connected to a terminal 54 through equal resistors 55 and 56. The terminal 54 is intended to be connected to the positive terminal of a high tension source (not shown) for the valves. The negative terminal of this source will be connected to the earth terminal 55. The screen grids of the valves 45 and 46 are connected to terminal 54 through a resistor 57, and to ground through a capacitor 58. The two suppressor grids are connected directly to ground.

The anodes of the valves 45 and 46 are connected also to the control winding of an inductor 60, having a saturable core, which forms part of the oscillator 15.

The elements 47, 48, 52 and 53 form a storage or integrating circuit with a large time constant (e. g. 1 second), which is about 50 times the complete sweep period of the oscillator 8 (Fig. 1). Thus the potential applied between the control grids of the valves 45 and 46 will be determined by the average phase shift of the test wave taken over a number of complete sweep cycles, and the control current supplied to the winding 59 will therefore also be determined by this average phase shift.

The oscillator 15 is of the well known bridge-stabilised type (similar to that described, for example, in British patent specification No. 510,379), and consists of an amplifier 61 having input and output transformers 62 and 63. The transformer 63 has two secondary windings one of which, 64, is connected to the primary winding of the transformer 25 of the quadrature detector 13. The other secondary winding 65 of the transformer 63 is connected to one pair of diagonal corners of the stabilising bridge 66. The other pair of diagonal corners of this bridge are connected to the primary winding of the transformer 62. In two opposite arms of the bridge there are connected resistors 67 and 68, and in one of the other arms is a temperature dependent resistor 69 such, for example, as a thermistor. The remaining arm of the bridge contains piezo-electric crystal 70 adjusted to resonate at a frequency of 100 kilocycles per second, a variable capacitor 71, and the inductive winding 72 of the inductor 60, all connected in series. A permanent magnet 73 issued to provide a biassing flux for the core of the inductor 60. The arrangement of this inductor will be explained more fully with references to Figs. 3 and 4.

A direct current measuring instrument 74 is connected in series with the control winding 59 of the inductor 60. This instrument is used for adjusting the frequency of the oscillator 15 when setting up the circuit at the beginning of the test.

The winding 72 of the inductor 60, and the capacitor 71, form a series resonant circuit arranged to present a very small trimming reactance at the frequency of oscillation, which will be fixed close to 100 kilocycles per second by the crystal 70. Adjustment of the inductance of the winding 72 will change the trimming reactance, and will make a corresponding very small change in the oscillation frequency, and as a consequence, there will be a small change in the phase.

Under normal conditions of operation, the anodes of the valves 45 and 46 will be at the same potential, and so the current supplied to the winding 59 will be zero. If the phase of the waves generated by the oscillator 15 is not exactly in quadrature with the average phase of the waves supplied to terminals 37 and 38, a difference of potential will appear between the anodes of the valves 45 and 46 and so a control current will be supplied to the winding 59, which changes the inductance of the winding 72 in such manner as to bring the phases into exact quadrature. The condition required at the commencement of the test is that there shall be no control current in the winding 59; accordingly the capacitor 71 should be initially adjusted in such a manner as to reduce to zero the current supplied to winding 59, this current being indicated by the instrument 74. Thereafter, if the phase of the waves generated by the oscillator 15 should tend to drift slightly, a small current will be supplied to the winding 59, to bring the phase back into quadrature with the average phase of the recovered test wave.

The inductor 60 may be constructed by suitably winding a toroidal core, the plan view of which is shown at 75 in Fig. 3. One part of the core is reduced to form two narrow necks 76 and 77 separated by an aperture 78 as shown in Fig. 4, which is a side view of the core 75 as seen in the direction of the arrow A of Fig. 3. The actual windings which will be put on the core 75 are not shown in Figs. 3 and 4 in order to avoid complicating the drawings. The core 75 can most easily be constructed from two similar halves, as indicated by the dotted line 79 in Fig. 4. On each of the necks 76 and 77 is wound a solenoid winding (not shown). The two solenoid windings constitute the winding 72 (Fig. 2), and are connected together in series in such a manner that when the magnetic flux passing through the neck 76 due to a current in the windings is in the direction of the arrow 80, the magnetic flux passing through the neck 77 is in the opposite direction, as indicated by the arrow 81. The two solenoidal windings which thus make up the winding 72 shown in Fig. 2 form substantially a winding with a closed core round which the flux due to the solenoidal winding circulates. After having applied the solenoidal windings as described, the whole of the toroidal core 75 is then wound with a winding (not shown) which corresponds to the winding 59. This winding will preferably be wound also over the solenoidal windings already on the necks 76 and 77. A current in the control winding 59 applied in this way will produce a flux which circulates round the whole of the core 75, as indicated by the arrows 82 and 83 which flux will be in the same direction in the two necks 76 and 77. Changes in this flux will not produce any electromotive force in the complete windings 72, since the electromotive force induced thereby in the separate solenoidal portions will be in opposition. The flux produced in the winding 59 is used to vary the effective permeability of the core so that the inductance of the winding 72 will, therefore, be changed.

As it is necessary that the change of the inductance of the winding 72 should vary in sign as well as in magnitude with the control current in the winding 59, and as it is desirable to choose the operating point on the characteristic curve of the magnetic material so that a maximum change of effective permeability is produced by a given small change in the current in the winding 59, the permanent magnet 73 is placed with its poles near the wound core 75 opposite the necks 76 and 77, in the manner shown in Fig. 3. This magnet produces a local biasing flux which passes through the two necks 76 and 77. The amount of bias may be adjusted by sliding the magnet 73 along the dotted line 84 as shown in Fig. 3. This magnet should be adjusted to produce a maximum change in inductance of the winding 72 for a given control current in the winding 59. The biasing flux could also, if desired, be produced by an additional bias winding (not shown) on the core 75 through which there is passed an adjustable bias current, but if the apparatus is required to be made up in portable form with its own power supply unit, it may be found inconvenient to provide this additional bias current, and the desired effect can be more easily produced by the magnet 73 as described.

It will be understood that although for the purpose of describing the invention clearly particular frequency and other values have been suggested, these values are not essential to the invention and may be changed as circumstances dictate.

It may be added also that although in the embodiment described above, the carrier waves transmitted over the system under test are amplitude modulated by the test wave, it would also be possible to use frequency or phase modulation, instead of amplitude modulation, without any modification of the features with which the invention is particularly concerned.

While the principles of the invention have been described above in connection with specific embodiments, and particular modifications thereof, it is to be clearly understood that this description is made only by way of example and not as a limitation on the scope of the invention.

What we claim is:

1. An arrangement for measuring the group delay distortion introduced by a high frequency communication system over a specified band of frequencies, comprising at the sending end, means for transmitting over the system a high frequency carrier wave modulated by a test, wave having a given frequency outside the specified band, and means for periodically sweeping the frequency of the said high frequency wave over the said band; and at the receiving end, means for recovering the test wave from the carrier wave, a local source of a comparison wave having the given frequency, means for indicating the instantaneous phase difference between the recovered test wave and the comparison wave, and control means responsive to the average phase of the recovered test wave integrated over a period of several sweep cycles for automatically stabilising the phase of the comparison wave.

2. An arrangement according to claim 1 in which the means for indicating the instantaneous phase difference includes a phase quadrature detector adapted to produce an output voltage pending in magnitude and sign on the instantaneous difference from phase quadrature between the recovered test wave and the comparison wave, a storage circuit having a time constant large compared with the sweep period for deriving from the said output voltage a control current, and means for applying the said control current to automatically stabilize the frequency of the said source.

3. An arrangement according to claim 2 in which the said source comprises a frequency determining circuit including a resonant circuit having an inductor, and means for applying the control current to vary the inductance of the inductor.

4. An arrangement according to claim 3 in which the said inductor comprises a coil wound on a saturable magnetic core, a control winding wound on the said core, and means for supplying the control current to the said control winding for varying the degree of saturation of the said core.

5. An arrangement according to claim 4, in which the said core comprises a toroid of saturable magnetic material, the said core being formed at one point with two parallel narrow necks, and in which two similar solenoids are wound respectively on the said necks and are connected in series in such manner that a current passed through the said solenoids produces a local circulating flux, the toroid being also wound with a control winding to which the said control current is supplied.

6. An arrangement according to claim 5 comprising means for applying a bias flux to the said saturable core.

7. An arrangement according to claim 6 in which the means for applying bias flux comprises a permanent magnet placed with its poles near to the said core, opposite the said necks.

8. An arrangement according to claim 3, in which the said source comprises a bridge-stabilised oscillator in which the frequency is determined by a piezo-electric crystal, and in which the said resonant circuit is a series resonant circuit connected in series with the said crystal.

References Cited in the file of this patent

UNITED STATES PATENTS

| | | |
|---|---|---|
| 1,450,966 | Affell | Apr. 10, 1923 |
| 2,542,627 | Chevallier | Feb. 20, 1951 |
| 2,554,391 | Tellier et al. | May 22, 1951 |
| 2,588,094 | Eaton | Mar. 4, 1952 |
| 2,625,614 | Schelleng | Jan. 13, 1953 |
| 2,774,873 | Rieke | Dec. 18, 1956 |